United States Patent
Tsuji

(10) Patent No.: US 10,108,244 B2
(45) Date of Patent: Oct. 23, 2018

(54) ELECTRONIC APPARATUS AND NON-TRANSITORY COMPUTER READABLE MEDIUM FOR POWER CONSUMPTION CONTROL OF PROCESSORS

(71) Applicant: KYOCERA DOCUMENT SOLUTIONS INC., Osaka (JP)

(72) Inventor: Shuntaro Tsuji, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 232 days.

(21) Appl. No.: 15/171,382

(22) Filed: Jun. 2, 2016

(65) Prior Publication Data

US 2016/0378164 A1  Dec. 29, 2016

(30) Foreign Application Priority Data

Jun. 29, 2015  (JP) ................. 2015-129380

(51) Int. Cl.
  G06F 9/455  (2018.01)
  G06F 1/32  (2006.01)
  G06F 9/4401  (2018.01)
  G06F 9/48  (2006.01)

(52) U.S. Cl.
  CPC .......... G06F 1/3228 (2013.01); G06F 1/3287 (2013.01); G06F 9/4418 (2013.01); G06F 9/4881 (2013.01); Y02D 10/44 (2018.01)

(58) Field of Classification Search
  CPC .... G06F 1/3228; G06F 9/4418; G06F 9/4881; G06F 9/3287; Y02D 10/44
  See application file for complete search history.

(56) References Cited

U.S. PATENT DOCUMENTS

| | | | | |
|---|---|---|---|---|
| 2008/0109665 A1* | 5/2008 | Kuhlmann | ............ | G06F 1/3203 713/300 |
| 2009/0328055 A1* | 12/2009 | Bose | ..................... | G06F 1/3203 718/105 |
| 2011/0219246 A1 | 9/2011 | Arai | | |
| 2013/0191613 A1* | 7/2013 | Takahashi | ............... | G06F 15/76 712/30 |
| 2014/0192653 A1* | 7/2014 | Jung | ................... | H04L 67/1002 370/236 |

FOREIGN PATENT DOCUMENTS

| | | |
|---|---|---|
| GB | 2402519 A | 12/2004 |
| JP | 2004-355153 A | 12/2004 |
| JP | 2010201961 A | 9/2010 |
| JP | 2011186531 A | 9/2011 |
| JP | 2013-041366 A | 2/2013 |
| JP | 2013-149221 A | 8/2013 |

* cited by examiner

Primary Examiner — Lewis A Bullock, Jr.
Assistant Examiner — Kevin X Lu
(74) Attorney, Agent, or Firm — Li & Cai Intellectual Property (USA) Office

(57) ABSTRACT

Provided is an electronic apparatus including: a processor including a plurality of cores that divisionally execute a plurality of tasks; a total task amount calculation circuit that calculates, for each of the cores, a total task amount as a total processing amount of the plurality of tasks to be executed; a sleep shift processing circuit that causes one of the plurality of cores to shift to a sleep mode based on the total task amount calculated for each of the cores; and a sleep recovery processing circuit that causes, when the one of the cores is in the sleep mode, the core in the sleep mode to recover from the sleep mode based on the total task amount.

10 Claims, 5 Drawing Sheets

17a: Task amount table

|  | Processing amount of each task | Core 0 | | Core 1 | |
|---|---|---|---|---|---|
|  |  | Division ratio | Assigned processing amount | Division ratio | Assigned processing amount |
| Task A | 100 | 70% | 70 | 30% | 30 |
| Task B | 90 | 20% | 18 | 80% | 72 |
| Task C | 60 | 40% | 24 | 60% | 36 |
| Task D | 70 | 70% | 49 | 30% | 21 |
| Task E | 120 | 10% | 12 | 90% | 108 |
| Task F | 50 | 50% | 25 | 50% | 25 |
| Total task amount | 490 |  | 198 |  | 292 |

FIG.3

ELECTRONIC APPARATUS AND NON-TRANSITORY COMPUTER READABLE MEDIUM FOR POWER CONSUMPTION CONTROL OF PROCESSORS

INCORPORATION BY REFERENCE

This application claims the benefit of Japanese Priority Patent Application JP 2015-129380 filed Jun. 29, 2015, the entire contents of which are incorporated herein by reference.

BACKGROUND

The present disclosure relates to an electronic apparatus that performs low power consumption control of a plurality of processors or a processor having a plurality of cores and to a non-transitory computer readable recording medium onto which a power supply control program is recorded.

Regarding an electronic apparatus including a plurality of processors (CPUs; Central Processing Units) or a CPU including a plurality of cores, it is desirable for a part of the CPUs or cores to sleep so as to lower power consumption.

SUMMARY

It is therefore desirable to cause a part of a CPUs or cores to sleep so as to lower power consumption using a simple technique.

According to an embodiment of the present disclosure, there is provided an electronic apparatus including: a processor including a plurality of cores that divisionally execute each of a plurality of tasks; a total task amount calculation circuit that calculates, for each of the cores, a total task amount as a total processing amount of the plurality of tasks to be executed; a sleep shift processing circuit that causes one of the plurality of cores to shift to a sleep mode based on the total task amount calculated for each of the cores; and a sleep recovery processing circuit that causes, when the one of the cores is in the sleep mode, the core in the sleep mode to recover from the sleep mode based on the total task amount.

With this structure, it is possible to cause a part of CPUs or cores to sleep by software to lower power consumption without using special hardware.

According to an embodiment of the present disclosure, there is provided a non-transitory computer readable recording medium that records a power supply control program executable by a computer, the power supply control program causing the computer to: operate on a processor including a plurality of cores that divisionally execute a plurality of tasks; calculate, for each of the cores, a total task amount as a total processing amount of the plurality of tasks to be executed; cause one of the plurality of cores to shift to a sleep mode based on the total task amount calculated for each of the cores; and cause, when the one of the cores is in the sleep mode, the core in the sleep mode to recover from the sleep mode based on the total task amount.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 3 shows an example of a task amount table.

DETAILED DESCRIPTION OF EMBODIMENTS

Hereinafter, an embodiment of the present disclosure will be described with reference to the drawings.

(General Outline)

First, a general outline will be described.

Figure 1:
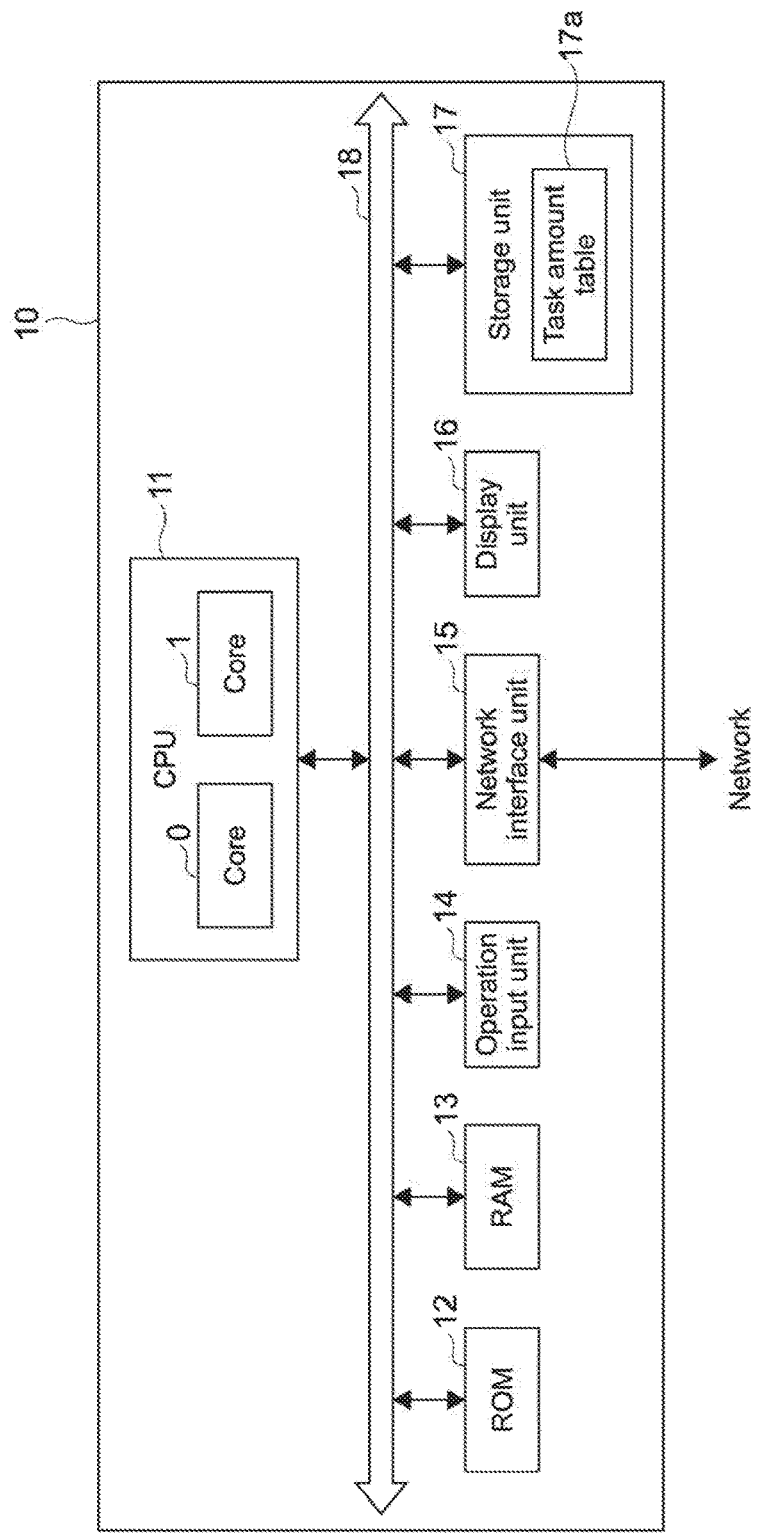
FIG. 1 shows a structure of an electronic apparatus 10.

As shown in FIG. 1, an electronic apparatus 10 according to the embodiment of the present disclosure includes one CPU 11. The CPU 11 includes two SMP (Symmetric Multi-Processing) cores, that is, cores 0 and 1. The cores 0 and 1 are capable of communicating with each other via a shared memory and the like.

It should be noted that although the descriptions below will be given based on a single multi-core CPU, the same holds true for a case where the electronic apparatus includes a plurality of SMP-type CPUs.

In this embodiment, when a total task amount (to be described later) of one core falls below a first threshold value and a total task amount of the other core does not become excessively large (does not exceed second threshold value), the core whose total task amount has fallen below the first threshold value is put to a sleep mode, and a task that has originally been responsible of processing is shared with the other core not in the sleep mode.

Here, when the total task amounts of both of the cores fall below the first threshold value, the core having a smaller total task amount is put to the sleep mode, and a task that has originally been responsible of processing is shared with the other core not in the sleep mode.

It should be noted that the first threshold value may be set to be smaller than the second threshold value. For example, the first threshold value may be set to be 20% the total task amount that the core is capable of processing within a certain time, and the second threshold value may be set to be 60% the total task amount that the core is capable of processing within the certain time.

Further, in a case where the total task amount exceeds a third threshold value at a time one core is sleeping and only the other core is processing a task, the core in the sleep mode is recovered from the sleep mode, and the processing is continued using the two cores.

Here, the third threshold value may be set to be larger than the second threshold value. For example, when the cores 0 and 1 have the same processing capacity and the second threshold value is 60% the total task amount that the core is capable of processing within the certain time, the third threshold value may be set to be 80% the total task amount that the core is capable of processing within the certain time.

With this structure, it is possible to cause a part of the CPUs or cores to sleep by software to lower power consumption without using special hardware.

The general outline has been described heretofore.

(Structure of Electronic Apparatus 10)

Next, the structure of the electronic apparatus 10 will be described. The electronic apparatus 10 may be constituted of dedicated hardware or software, or may be constituted of a general-purpose computer. The structure of the electronic apparatus 10 when constituted of a general-purpose computer is shown in FIG. 1.

As shown in FIG. 1, the electronic apparatus 10 includes the CPU 11, a ROM (Read Only Memory) 12, a RAM (Random Access Memory) 13, an operation input unit 14, a network interface unit 15, a display unit 16, and a storage unit 17, and these blocks are connected via a bus 18.

It should be noted that in the descriptions below, the CPU 11 is described as having a dual-core structure including the cores 0 and 1. In this embodiment, however, the structure is not limited to the dual core, and the present disclosure is also applicable to a CPU constituted of 3 or more cores.

The ROM 12 fixedly stores a plurality of programs such as firmware for executing various types of processing, and data. The RAM 13 is used as a working area of the CPU 11 and temporarily stores an OS, various applications being executed, and various types of data being processed.

The storage unit 17 is, for example, an HDD (Hard Disk Drive), a flash memory, or other nonvolatile memories. The storage unit 17 stores a task amount table 17a to be described later in addition to the OS, various applications, and various types of data.

The network interface unit 15 is connected to a network for exchanging information with an external apparatus.

The CPU 11 develops a program corresponding to an instruction given via the operation input unit 14 in the RAM 13 out of the plurality of programs stored in the ROM 12 or the storage unit 17 as an example of a non-transitory computer readable recording medium, and controls the display unit 16 and the storage unit 17 as appropriate based on the developed program.

The operation input unit 14 is, for example, a pointing device such as a mouse, a keyboard, a touch panel, or other operation apparatuses.

The display unit 16 is, for example, a liquid crystal display, an EL (Electro-Luminescence) display, a plasma display, or a CRT (Cathode Ray Tube) display. The display unit 16 may be built in the electronic apparatus 10 or may be connected externally.

Figure 2:
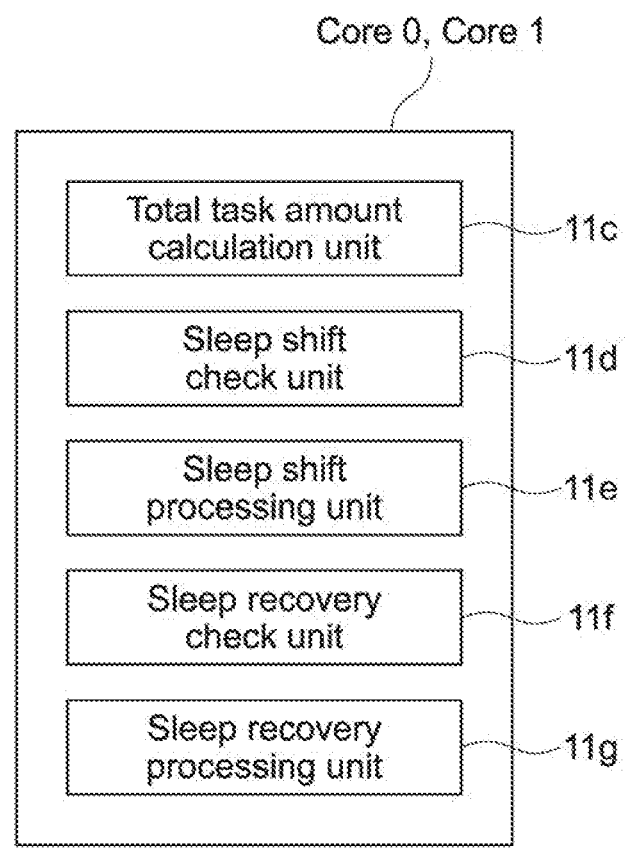
FIG. 2 is a functional block diagram of a CPU 11.

It should be noted that as shown in FIG. 2, the cores 0 and 1 each include a total task amount calculation unit 11c, a sleep shift check unit 11d, a sleep shift processing unit 11e, a sleep recovery check unit 11f, and a sleep recovery processing unit 11g. The total task amount calculation unit 11c, the sleep shift check unit 11d, the sleep shift processing unit 11e, the sleep recovery check unit 11f, and the sleep recovery processing unit 11g are functional blocks realized as the programs loaded to the RAM 13 from the ROM 12 or the like as an example of the non-transitory computer readable recording medium are executed by the core 0 or 1.

The total task amount calculation unit 11c updates the task amount table 17a to be described later, and uses the updated task amount table 17a to calculate a total task amount.

The sleep shift check unit 11d checks the total task amount at a time point one task is ended in the core 0 or 1 and checks whether a condition to shift the core 0 or 1 to sleep is satisfied.

As well as shifting the core whose total task amount has become small, for example, the core 1, to a sleep mode, the sleep shift processing unit 11e transmits a sleep shift notification to the other core 0 and causes the other core 0 not in the sleep mode to remember that the sleep shift notification has been received and the core 1 has shifted to the sleep mode.

At a time point one task is ended in the core not in the sleep mode, the sleep recovery check unit 11f checks the total task amount and checks whether the condition to cause the sleeping core to recover from the sleep mode is established.

The sleep recovery processing unit 11g causes the sleeping core to recover from the sleep mode and restores the task that has been processed in only the core not in the sleep mode to a mode where the task is divisionally processed by the two cores based on the original assignment.

The structure of the electronic apparatus 10 has been described heretofore.

(Regarding Task Amount Table)

Next, the task amount table 17a used for obtaining a total task amount that is used in the determination when causing the cores to sleep or recover from the sleep will be described. FIG. 3 shows an example of the task amount table 17a. This example shows a state at a time point a task Z is ended in the core 1 and a total task amount is checked.

For example, a task A needs to execute 100 instructions (e.g., assembler instructions) before completing the task A. Of the 100 instructions, the assignment of the core 0 is 70%, so the processing amount of the core 0 when executing the task A becomes 70.

The tasks A to F are to be processed by the CPU 11, and thus the processing amount of the tasks (total task amount) is 490.

Further, the total task amount of the core 0 is 198, and that of the core 1 is 292.

It should be noted that the ratio by which one task is to be divisionally executed by the two cores may be predetermined by a designer of the electronic apparatus 10. For example, in the case of haste processing, the assignment of the cores 0 and 1 may be 50% each.

Moreover, for example, in the case where the electronic apparatus 10 is an image forming apparatus (MFP; Multifunction Peripheral) and a designer thereof can easily determine the assignment of tasks while designing, for example, in a copy processing of reading a script and printing it, it is possible to assign a larger portion of reading processing to one of the cores and assign a larger portion of print processing to the other core. With such an assignment, even when the print processing is incomplete, the one core may be shifted to the sleep mode at a time point the reading processing is ended, to thus realize low power consumption.

It should be noted that the task amount table 17a is managed by the total task amount calculation unit 11c.

The task amount table 17a has been described heretofore.

(Processing Flow (at Time of Sleep Shift))

Figure 4:
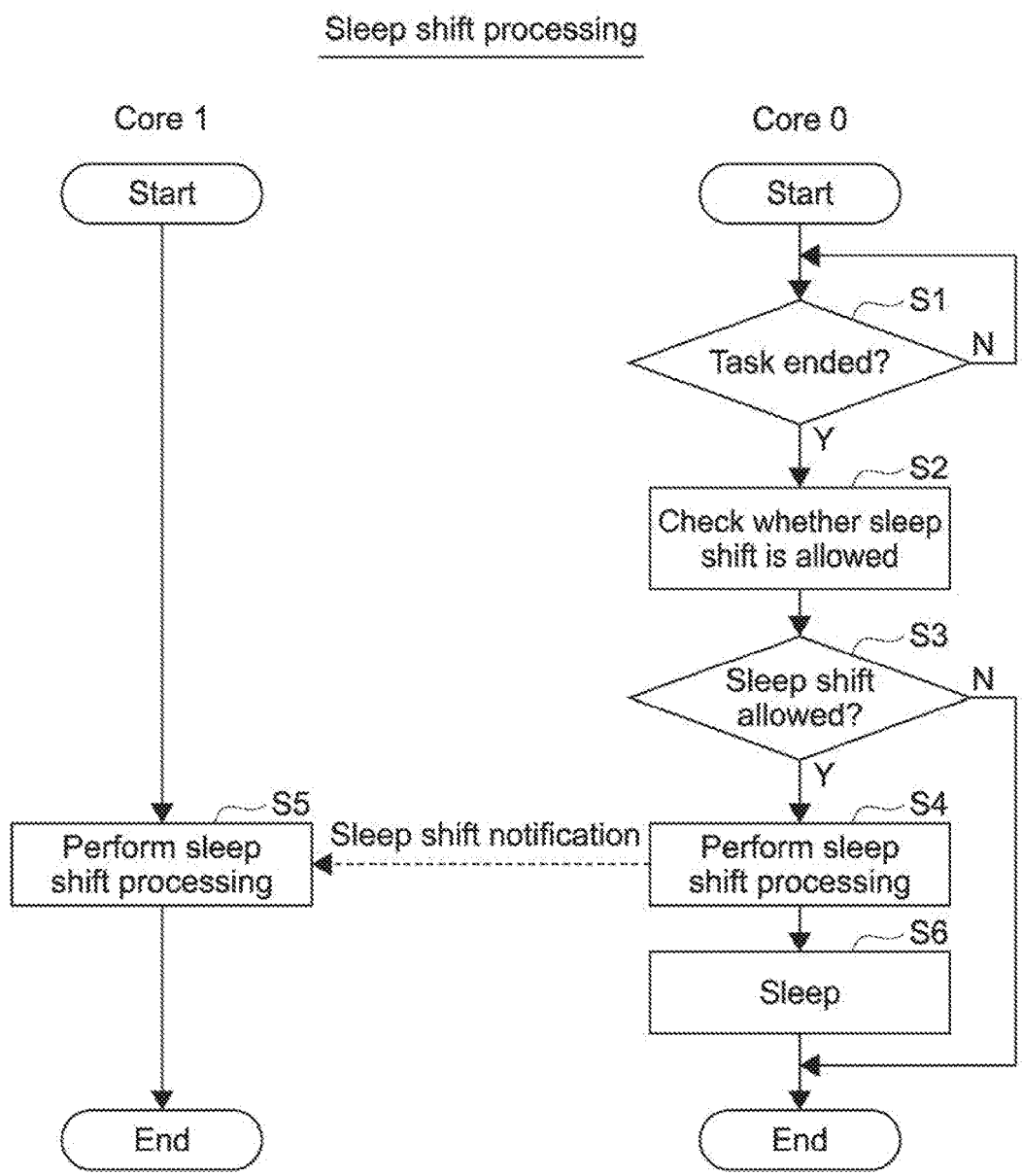
FIG. 4 shows processing steps at a time one core with a small total task amount shifts to a sleep mode.

Next, processing carried out when one core whose total task amount has become small is shifted to the sleep mode will be described. FIG. 4 is a flowchart for explaining the processing carried out when one core whose total task amount has become small is shifted to the sleep mode.

It should be noted that herein, descriptions will be given on an example of a case where it is determined that there is no problem for the core 1 to process the tasks originally assigned to two cores due to a low load of the core 0, and the core 0 is then shifted to the sleep mode.

First, in the core 0, the sleep shift check unit 11d determines whether one of the tasks that are being processed in the core 0 has ended (Step S1).

When the task has not ended (N in Step S1), the sleep shift check unit 11d returns to Step S1 and continuously checks the end of a task.

When the task has ended (Y in Step S1), the sleep shift check unit 11d of the core 0 makes an inquiry to the total task amount calculation unit 11c and checks whether the core 0 is allowed to sleep (Step S2). Specifically, the sleep shift check unit 11d checks whether the total task amount of the core 0 falls below a first threshold value and the total task amount that is to be processed by the core 1 while the core 0 is sleeping does not exceed a second threshold value.

Next, the sleep shift check unit 11d of the core 0 determines whether the core 0 is allowed to shift to sleep (Step S3).

When determined as not allowed to shift to sleep (N in Step S3), the sleep shift processing is not carried out, and the processing is continuously carried out divisionally by the two cores.

When determined as allowed to shift to sleep (Y in Step S3), the sleep shift processing unit 11e of the core 0 carries out processing for putting the core 0 itself to sleep and transmits a sleep shift notification for notifying that the core 0 is shifting to sleep to the sleep shift processing unit 11e of the core 1 as the other core (Step S4).

The sleep shift processing unit 11e of the core 1 that has received the sleep shift notification recognizes that the core 0 has slept and takes over the task processing that has been assigned to the core 0 (Step S5).

Next, the core 0 enters the sleep mode (Step S6). It should be noted that the sleep mode of the core may include a state where power supply to the sleeping core is shut off.

Heretofore, processing carried out when one core whose total task amount has become small is shifted to the sleep mode has been described.

(Processing Flow (at Time of Recovering from Sleep))

Figure 5:
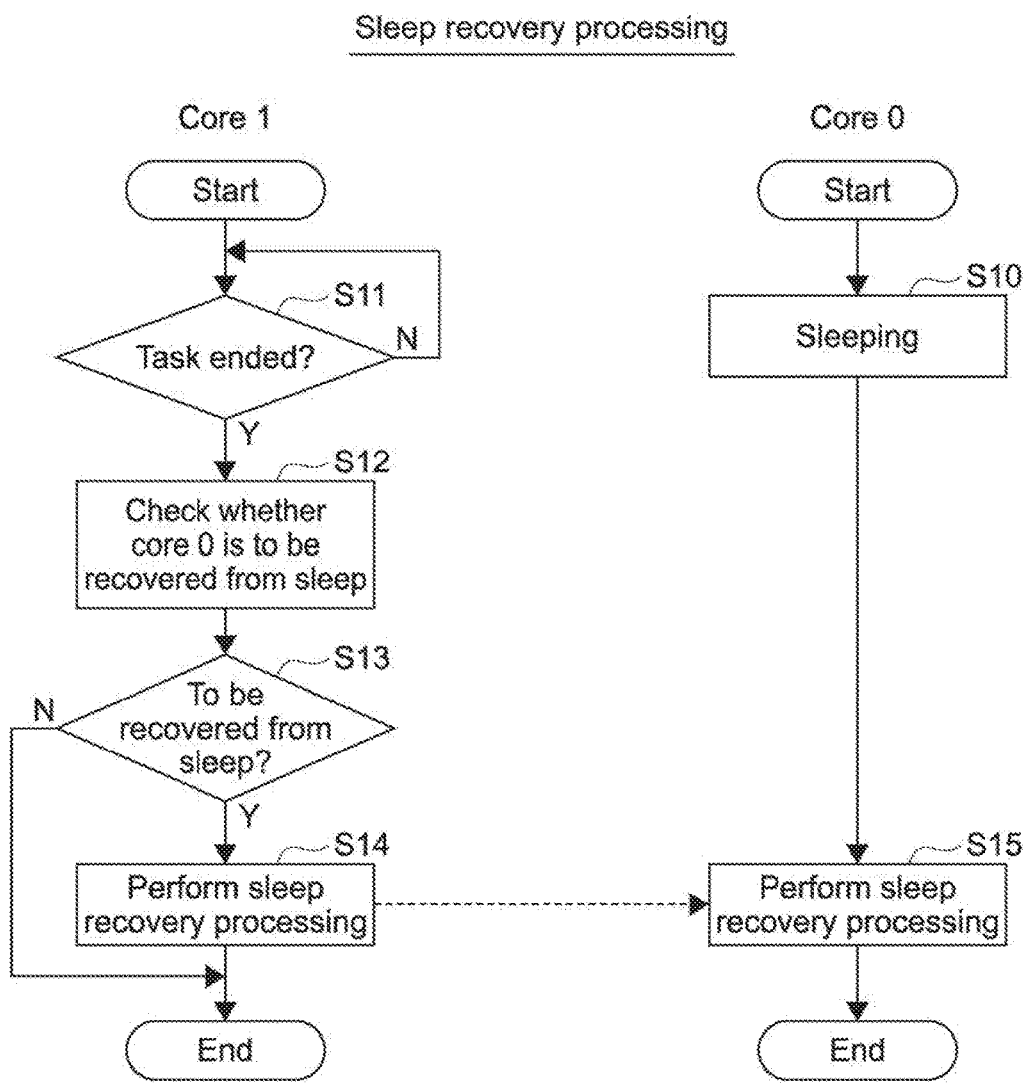
FIG. 5 shows processing steps at a time when, while one core is in the sleep mode, the total task amount of the other core increases, and the core in the sleep mode is restored from the sleep mode.

Next, processing carried out when, while one of the cores is in the sleep mode, the total task amount of the other core increases and the sleeping core is caused to recover from the sleep mode will be described. FIG. 5 is a flowchart for explaining the processing carried out when, while one of the cores is in the sleep mode, the total task amount of the other core increases and the sleeping core is caused to recover from the sleep mode.

It should be noted that herein, descriptions will be given on an example of a case where, while the core 0 is in the sleep mode, the total task amount for both cores, that is being processed by the core 1, increases and the core 0 is caused to recover from the sleep mode.

First, it is assumed that the core 0 is in the sleep mode (Step S10).

Next, the sleep recovery check unit 11f of the core 1 determines whether one of the tasks that are being processed in the core 1 has ended (Step S11).

When the task has not ended (N in Step S11), the sleep recovery check unit 11f of the core 1 returns to Step S11 and continuously checks whether a task has ended.

When the task has ended (Y in Step S11), the sleep recovery check unit 11f of the core 1 makes an inquiry to the total task amount calculation unit 11c and checks whether the core 0 is to be recovered from the sleep (Step S12). Specifically, the sleep recovery check unit 11f checks whether the total task amount of the core 1 exceeds a third threshold value.

Next, the sleep recovery check unit 11f of the core 1 determines whether the core 0 is to be recovered from the sleep mode (Step S13).

When determined as unnecessary to recover from the sleep (N in Step S13), the sleep recovery processing of the core 0 is not carried out, and the processing is continued only by the core 1.

When determined as necessary to recover from the sleep (Y in Step S13), the sleep recovery processing unit 11g of the core 1 carries out processing for causing the core 0 to recover from the sleep mode and hands over the processing that has originally been assigned to the core 0 and has been processed by the core 1, to the core 0 after the recovery of the core 0 (Steps S14 and S15).

For example, when the total task amount that the cores 0 and 1 are capable of processing within a certain time is 270, the first threshold value, the second threshold value, and the third threshold value are set to 54, 162, and 216, respectively.

At this time, if the tasks E and F shown in FIG. 3 are being processed when it is determined that the task has ended by the core 0 (Y in Step S1), the total task amount of the core 0 is 37 (=12+25), and the total task amount of the core 1 is 133 (=108+25).

As a result, the total task amount of the core 0 (37) falls below the first threshold value (50), and the total task amount of the core 1 (133) does not exceed the second threshold value (150).

Consequently, the sleep shift check unit 11d of the core 0 determines as allowed to shift to sleep (Y in Step S3), and the core 0 enters the sleep mode via Steps S4 and S6. Since the core 1 takes over the processing of the tasks E and F that have been assigned to the core 0 (Step S5), the total task amount of the core 1 becomes 170 (=120+50).

Next, assuming that the task A shown in FIG. 3 has occurred, the core 1 starts processing of the task A. In addition, as the core 1 ends the task F (Y in Step S11), the total task amount of the core 1 becomes 220 (=100+120).

Since the total task amount (220) exceeds the third threshold value (216), the sleep recovery check unit 11f of the core 1 determines that the core 0 is to be recovered from the sleep mode (Y in Step S13) and causes the core 0 to recover from the sleep mode via Steps S14 and S15.

After recovery of the core 0, the processing corresponding to the division ratio of the core 0 out of the processing of the tasks A and E that has been processed by the core 1, is handed over to the core 0. Consequently, the total task amount of the core 0 becomes (=70+12), and the total task amount of the core 1 becomes 138 (=30+108).

It should be noted that in the case where it takes time to hand over the processing that has originally been assigned to the core 0, from the core 1 to the core 0, it is possible to cause the core 1 to temporarily continue the processing even after the recovery of the core 0 so that the shift from the core 1 to the core 0 is made smoothly.

Heretofore, the descriptions have been given on the processing carried out when, while one of the cores is in the sleep mode, the total task amount of the other core increases and the sleeping core is caused to recover from the sleep mode.

(Supplementary Note)

The electronic apparatus 10 according to the embodiment of the present disclosure includes: the CPU 11 including a plurality of cores that divisionally execute a plurality of tasks; the total task amount calculation unit 11c that calculates, for each of the cores, a total task amount as a total processing amount of the plurality of tasks to be executed; the sleep shift processing unit 11e that causes one of the plurality of cores to shift to a sleep mode based on the total task amount calculated for each of the cores; and the sleep recovery processing unit 11g that causes, when the one of the cores is in the sleep mode, the core in the sleep mode to recover from the sleep mode based on the total task amount.

With this structure, it is possible to cause a part of the CPUs or cores to sleep by software to lower power consumption without using special hardware.

In addition, the present disclosure is not limited to the embodiment described above and may of course be variously modified without departing from the gist of the present disclosure.

For example, in the embodiment above, the sleep shift check unit 11d may determine whether a new task has occurred in Step S1 of FIG. 4 and Step S11 of FIG. 5 instead of determining an end of a task. In this case, as a new task occurs, the processing advances to Step S2 or Step S12.

Alternatively, the sleep shift check unit 11d may determine whether a new task has occurred in addition to the determination of an end of a task in Step S1 of FIG. 4 and Step S11 of FIG. 5. In this case, when it is determined that a task has ended or a new task has occurred, the processing advances to Step S2 or Step S12.

Furthermore, while all the cores are processing tasks, if a total task amount assigned to one of the cores exceeds a total task amount that can be processed within a certain time due to an occurrence of a new task, the sleep shift processing unit 11e may assign an excessive portion of the new task to the other core.

The invention claimed is:

1. An electronic apparatus, comprising:
a processor including a plurality of cores that divisionally execute each of a plurality of tasks;
a total task amount calculation circuit that calculates, for each of the cores, a total task amount as a total processing amount of the plurality of tasks to be executed;
a sleep shift processing circuit that causes a part of the plurality of cores to shift to a sleep mode based on the total task amount calculated for each of the cores;
a sleep recovery processing circuit that causes, when the one of the cores is in the sleep mode, the core in the sleep mode to recover from the sleep mode based on the total task amount;
a sleep shift check circuit that determines whether the total task amount of a specific core has fallen below a first threshold value; and
a sleep recovery check circuit that determines, when one of the cores is in the sleep mode, whether the total task amount of the cores not in the sleep mode exceeds a third threshold value,
wherein
the sleep shift processing circuit causes the cores whose total task amount has fallen below the first threshold value to shift to the sleep mode based on the determination by the sleep shift check circuit,
the sleep shift check circuit further determines whether the total task amount of the cores excluding the cores whose total task amount has fallen below the first threshold value exceeds a second threshold value,
the sleep shift processing circuit causes, when the total task amount of the cores excluding the cores whose total task amount has fallen below the first threshold value does not exceed the second threshold value based on the determination by the sleep shift check circuit, the cores whose total task amount has fallen below the first threshold value to shift to the sleep mode,
the sleep recovery processing circuit causes, when the total task amount of the cores not in the sleep mode exceeds the third threshold value based on the determination by the sleep recovery check circuit, the cores in the sleep mode to recover from the sleep mode,
the first threshold value is smaller than the second threshold value, and
the third threshold value is larger than the second threshold value.

2. The electronic apparatus according to claim 1, wherein the sleep shift processing circuit hands over a task that the core, which has been shifted to the sleep mode, has been processing to the core excluding the core that has been shifted to the sleep mode.

3. The electronic apparatus according to claim 1, wherein the sleep recovery processing circuit hands over a task that the core not in the sleep mode has been processing to the core that has been recovered from the sleep mode.

4. The electronic apparatus according to claim 1, wherein, when the total task amounts of the plurality of cores have fallen below the first threshold value, the sleep shift processing circuit
causes a core having a smaller total task amount to sleep, and
hands over a task that the core, which has been shifted to the sleep mode, has been processing to the core excluding the core that has been shifted to the sleep mode.

5. The electronic apparatus according to claim 1, further comprising
a sleep recovery check circuit that determines, when one of the cores is in the sleep mode, whether the total task amount of the core not in the sleep mode exceeds a third threshold value,
wherein the sleep recovery processing circuit causes, when the total task amount of the core not in the sleep mode exceeds the third threshold value based on the determination by the sleep recovery check circuit, the core in the sleep mode to recover from the sleep mode.

6. The electronic apparatus according to claim 5, wherein, after the core is recovered from the sleep mode, the sleep recovery processing circuit
temporarily causes the core not in the sleep mode to continue processing of the task to be executed by the core that has been recovered from the sleep mode, and
thereafter hands over the task that has temporarily been continued by the core not in the sleep mode to the core that has been recovered from the sleep mode.

7. The electronic apparatus according to claim 1, wherein the plurality of cores have the same processing capacity,
the first threshold value is 20% the total task amount that the core is capable of processing within a certain time,
the second threshold value is 60% the total task amount that the core is capable of processing within the certain time, and
the third threshold value is 80% the total task amount that the core is capable of processing within the certain time.

8. The electronic apparatus according to claim 1, wherein:
the sleep shift check circuit determines whether a new task has occurred; and
the sleep shift processing circuit hands over, when the total task amount of one of the cores exceeds the total task amount that can be processed within a certain time due to the occurrence of a new task while all the plurality of cores are processing tasks, an excessive portion of the processing amount of the new task to the other core.

9. The electronic apparatus according to claim 1, wherein the processor including the plurality of cores is a plurality of symmetric-multiprocessing-type processors.

10. A non-transitory computer readable recording medium that records a power supply control program executable by a computer, the computer including a processor including a plurality of cores that divisionally execute each of a plurality of tasks, the power supply control program causing the computer to operate as:

a total task amount calculation circuit that calculates, for each of the cores, a total task amount as a total processing amount of the plurality of tasks to be executed;

a sleep shift processing circuit that causes one of the plurality of cores to shift to a sleep mode based on the total task amount calculated for each of the cores;

a sleep shift processing circuit that causes, when the one of the cores is in the sleep mode, the core in the sleep mode to recover from the sleep mode based on the total task amount;

a sleep shift check circuit that determines whether the total task amount of a specific core has fallen below a first threshold value; and a sleep recovery check circuit that determines, when one of the cores is in the sleep mode, whether the total task amount of the cores not in the sleep mode exceeds a third threshold value, wherein the sleep shift processing circuit causes the cores whose total task amount has fallen below the first threshold value to shift to the sleep mode based on the determination by the sleep shift check circuit, the sleep shift check circuit further determines whether the total task amount of the cores excluding the cores whose total task amount has fallen below the first threshold value exceeds a second threshold value, the sleep shift processing circuit causes, when the total task amount of the cores excluding the cores whose total task amount has fallen below the first threshold value does not exceed the second threshold value based on the determination by the sleep shift check circuit, the cores whose total task amount has fallen below the first threshold value to shift to the sleep mode, the sleep recovery processing circuit causes, when the total task amount of the cores not in the sleep mode exceeds the third threshold value based on the determination by the sleep recovery check circuit, the cores in the sleep mode to recover from the sleep mode, the first threshold value is smaller than the second threshold value, and the third threshold value is larger than the second threshold value.

\* \* \* \* \*